US007457030B2

(12) United States Patent
Okuno et al.

(10) Patent No.: US 7,457,030 B2
(45) Date of Patent: Nov. 25, 2008

(54) WAVELENGTH CONVERSION DEVICE

(75) Inventors: Tadashi Okuno, Okayama (JP); Akira Watanabe, Okayama (JP)

(73) Assignees: Photo-Physics Laboratory Inc., Okayama (JP); Cyber Laser Inc., Tokyo (JP)

(*) Notice: Subject to any disclaimer, the term of this patent is extended or adjusted under 35 U.S.C. 154(b) by 247 days.

(21) Appl. No.: 10/597,717

(22) PCT Filed: Feb. 4, 2005

(86) PCT No.: PCT/JP2005/001694

§ 371 (c)(1),
(2), (4) Date: Sep. 25, 2006

(87) PCT Pub. No.: WO2005/076066

PCT Pub. Date: Aug. 18, 2005

(65) Prior Publication Data

US 2008/0175282 A1 Jul. 24, 2008

(30) Foreign Application Priority Data

Feb. 6, 2004 (JP) ............................. 2004-030236

(51) Int. Cl.
G02F 2/02 (2006.01)
H01S 3/10 (2006.01)
(52) U.S. Cl. .................... 359/326; 359/328; 372/22
(58) Field of Classification Search ......... 359/326–329; 372/21–22
See application file for complete search history.

(56) References Cited

U.S. PATENT DOCUMENTS

2007/0025401 A1* 2/2007 Hayashi et al. ............... 372/22

FOREIGN PATENT DOCUMENTS

| JP | 6-125515 A | 5/1994 |
| JP | 8-234144 A | 9/1996 |
| JP | 10-325970 A | 12/1998 |

* cited by examiner

Primary Examiner—Hemang Sanghavi
(74) Attorney, Agent, or Firm—Pearne & Gordon LLP

(57) ABSTRACT

The energy conversion efficiency from light that is to be converted to converted light of a wavelength conversion device is adjusted so as always to be kept stably at a maximum. The wavelength conversion device is provided with a laser light source 10 for generating a fundamental wave light, a nonlinear optical crystal 16 into which the fundamental wave light is made to enter to generate converted light, and an optical path adjusting portion 30 for adjusting the direction of propagation of the fundamental wave light and the position of the light beam of the fundamental wave light in order to make the fundamental wave light enter the nonlinear optical crystal 16 while satisfying phase matching conditions. The optical path adjusting portion 30 is constituted so as to be provided with a first reflecting mirror 12 and a second reflecting mirror 14, and the first reflecting mirror is provided with adjustment means driven by motors M1 and M2, and the second reflecting mirror is provided with adjustment means driven by motors M3 and M4. Additionally, the wavelength conversion device is provided with a semi-transparent mirror 18 for splitting off and taking out one portion of output light 17, and a photodetector 22 for detecting this split off output light. An electrical signal 23 that is output from the photodetector 22 is input into an adjustment value calculating means 26, and in this adjustment value calculating means, the necessary adjustment values for the adjustment means in the optical path adjusting portion 30 are calculated using fuzzy inference, and this result is output to an optical path adjusting portion control device 28. The optical path adjusting portion control device 28 carries out adjustment of the optical path based upon output signals 27 from the adjustment value calculating means 26.

6 Claims, 10 Drawing Sheets

(A1)

(B1)

(A2)

(B2)

(A3)

(B3)

(A4)

(B4)

(A1)

Rule 21

(B1)

(A2)

Rule 22

(B2)

(A3)

Rule 23

(B3)

WAVELENGTH CONVERSION DEVICE

TECHNICAL FIELD

This invention concerns a device whereby output light (converted light) having a wavelength different from the wavelength of input light (light that is to be converted) can be obtained, using a nonlinear optical effect. In particular, it concerns a constitution for a wavelength conversion device which can constantly maintain the energy conversion efficiency from input light to output light stably at a maximum.

BACKGROUND ART

In wavelength conversion devices using nonlinear optical effects, light that is to be converted is input into a nonlinear optical crystal that exhibits nonlinear optical effects, and an important point is that the converted light that arises due to the nonlinear optical effects should be efficiently and stably outputted.

As one example, a wavelength conversion device that uses second harmonic generation (SHG) shall be explained. Therefore, in the following explanation, the input light may at times be called fundamental wave light, and the output light may at times be called converted light or SH light. Of course, nonlinear optical effects that are used for performing wavelength conversion are not restricted to SHG, there being wavelength conversion using other second-order nonlinear optical effects, similarly with SHG, such as differential frequency generation (DFG) or sum frequency generation (SFG), and additionally, wavelength conversion that uses higher order nonlinear optical effects of third-order or higher. The fundamental constitution that generates converted light efficiently in the wavelength conversion device using SHG explained below, can similarly be used, of course, in wavelength conversion devices that use second-order nonlinear optical effects, such as DFG and SFG described above, and not only these but also wavelength conversion devices that use third or higher order nonlinear optical effects.

In the wavelength conversion device using SHG described above, it is necessary to irradiate fundamental wave light at an angle that satisfies the phase matching conditions relative to the crystal axis of crystals, such as LiNbO$_3$ (lithium niobate) and BBO ($\beta$-BaB$_2$O$_4$: beta barium borate) that produce nonlinear optical effects (here, SHG). That is, in the above-mentioned wavelength conversion device, it is necessary that the direction of propagation of fundamental wave light relative to the crystal axis of the nonlinear optical crystal is consistent with an angle satisfying the phase matching conditions. Hereinafter, when the fundamental wave light enters at an angle (phase matching angle) that satisfies the phase matching conditions relative to the crystal axis of the nonlinear optical crystal, we shall, at times, simply say "enters while satisfying the phase matching angle." If the light can be made to enter while satisfying the phase matching angle, the SHG efficiency, that is, the wavelength conversion efficiency, can be maximized.

In order to make the light enter a nonlinear optical crystal while satisfying the phase matching angle, an optical path adjusting portion, constituted by appropriately placing reflecting mirrors and/or prisms and/or lenses and the like between the nonlinear optical crystal and the light source (laser light source) that generates the fundamental wave light, is provided. The direction of propagation of the fundamental wave light is adjusted using this optical path adjusting portion. Hereinafter, the light source that generates the fundamental wave light will be assumed to be a laser light source, and the placement configuration of the nonlinear optical crystal, reflecting mirrors, prisms, or lenses and the like shall be called the optical system of the wavelength conversion device.

The phase matching conditions are prescribed by the shape of the index ellipsoid of the nonlinear optical crystal relative to the fundamental wave light, and the shape of this index ellipsoid depends upon the temperature of the nonlinear optical crystal. The temperature of the nonlinear optical crystal constantly fluctuates during the operation of the wavelength conversion device, due to the effects of changes such as in ambient temperature. Therefore, in order to maintain the SHG conversion efficiency of the wavelength conversion device constantly at a maximum, it is necessary to constantly adjust the angle of incidence of the fundamental wave light relative to the crystal axis of the nonlinear optical crystal.

Additionally, in the manufacturing process of the wavelength conversion device, during the task of completing the optical system thereof by adjusting it so as to be optimal, in order to maximize the wavelength conversion efficiency, it is necessary to adjust the optical path of the fundamental wave light (direction of propagation of fundamental wave light) by adjusting the position, orientation, and the like of reflecting mirrors and the like that comprise the optical system. In addition, a wavelength conversion device, even after it has been completed after having been adjusted so that the wavelength conversion efficiency thereof is maximized, when the wavelength conversion device is run and its operation is then halted, when running it again afterwards, it will not be the case that the wavelength conversion efficiency of the device is reproduced in a maximum state. That is, the optical system of the wavelength conversion device must be adjusted so that the wavelength conversion efficiency is maximized, not only during the assembly process, but also whenever it is started to operate, and not only this, but it is necessary constantly to adjust the optical system during operation itself.

In the above-mentioned optical path adjusting portion, in order to adjust the optical path of the fundamental wave light, that is, in order to adjust the direction of propagation of fundamental wave light that enters the nonlinear optical crystal, an optical fine motion device equipped with a reflecting mirror or the like, such as a gimbal fine motor device is used to adjust the reflecting surface of the reflecting mirror and the angle of incidence of the fundamental wave light into this reflecting mirror. This fine motion adjusting device can make the reflecting surface of the reflecting mirror rotate, as well as undergo parallel translational motion, relative to the fundamental wave light that is incident upon the reflecting surface of the reflecting mirror. Parallel translational motion requires control of two axes in order to move in perpendicular x and y directions, and additionally, rotation also requires control of two axes in order to perform rotation around both the x axis and the y axis. That is, control of a total of four axes is necessary.

The above-mentioned task is generally called "alignment." Additionally, the optical path adjusting portion described above is constituted by combining a plurality of reflecting mirrors, or a plurality of prisms or the like. Therefore, alignment must be performed relative to a plurality of optical fine motion devices. The task of manipulating a plurality of optical fine motion devices, and determining the optimal optical path relative to the fundamental wave light is very difficult, and generally, the manual labor of experienced workers is relied upon. The reason that adjusting the optical path of a fundamental wave light by manipulating a plurality of optical fine motion devices is a highly difficult art is because during the act of adjusting a plurality of an optical fine motion devices, it is not the case that each optical fine motion device respectively determines the optical path of the fundamental wave light independently, but rather they are mutually dependent, so they do not respectively contribute independently to the determination of the optical path.

The alignment task mentioned above is, as already mentioned, necessary not only at the stage of manufacturing the wavelength conversion device, but also at each time the wavelength conversion device is utilized. This is because, due to changes of the ambient temperature in the place where the wavelength conversion device is installed and the like, tiny changes occur in relative positions and the like within the optical system of the wavelength conversion device. Due to these tiny changes, the angle of incidence of the fundamental wave light into the nonlinear optical crystal fluctuates, and becomes offset from the phase matching conditions, thereby lowering the wavelength conversion efficiency. Therefore, alignment is constantly necessary. Of course, in order to operate the wavelength conversion device under conditions that satisfy the phase matching requirements, due to the same reasons as those described above (changes in the ambient temperature of the wavelength conversion device and the like), alignment is necessary.

Therefore, during the manufacture of the wavelength conversion device, in order to adjust the optical path efficiently, and additionally, in order to realize the maximum wavelength conversion efficiency during operation or re-operation of the wavelength conversion device, the realization of a wavelength conversion device that can realize automatic control, by providing an optical path adjusting portion, is desired.

The cases where, in order to adjust the position and direction of propagation of a laser beam, the adjustment of a plurality of adjustment means is carried out in parallel, are not restricted merely to the wavelength conversion device described above. Cases where the adjustment of a plurality of adjustment means must be carried out in parallel in order to adjust an optical system include, for example, optical systems that are incorporated into exposure devices (also sometimes called steppers) that are used during semiconductor manufacture, or optical systems including line image sensors incorporated in manuscript reading devices, and the like.

Regarding methods or devices for automatically adjusting optical systems incorporated into exposure devices used during semiconductor manufacture, methods and devices have been disclosed that irradiates light on an alignment mark formed on a semiconductor wafer, and automatically detects the position of the alignment mark based upon a signal obtained by photoelectric conversion of the reflected light from the alignment mark (see, e.g., Patent Citation 1 and 2).

Additionally, regarding optical systems including line image sensors incorporated into manuscript reading devices, a device has been disclosed that automatically performs, in a device which reads in an image of a manuscript by image formation on a line image sensor using an image formation lens, the alignment of the focal point location, and the side registration, skew, or the slant of the manuscript (see, e.g., Patent Citation 3).

In each of these inventions, a control method based upon fuzzy inference has been used for the automation of the alignment, and thereby, simple and highly accurate alignment has been realized.

[Patent Citation 1] Japanese Patent No. 2517637
[Patent Citation 2] Japanese Patent Application Publication No. H09-232232
[Patent Citation 3] Japanese Patent No. 3077303

DISCLOSURE OF THE INVENTION

Problem to be Solved by the Invention

However, no device has yet been realized that can perform automatic adjustment based upon fuzzy inference on an optical system for a device that includes an optical crystal that is a nonlinear optical crystal or a laser activation medium as a constituent element. Therefore, the realization of a wavelength conversion device that can, by carrying out the alignment of an optical system based upon fuzzy inference, maintain the energy conversion efficiency from fundamental wave light to converted light at a maximum, stably and constantly, is desired.

Means for Solving the Problem

In order to achieve the aim described above, the wavelength conversion device of the present invention is provided with a laser light source, a nonlinear optical crystal, an optical path adjusting portion, a photodetector, an adjustment value calculating means, and an optical path adjusting portion control device. The laser light source outputs fundamental wave light that is light to be converted that will be irradiated onto the nonlinear optical crystal. The nonlinear optical crystal, by having fundamental wave light that is to be converted irradiated onto it, generates converted light that has different wavelength from the wavelength of the fundamental wave light. The optical path adjusting portion adjusts the direction of propagation of the fundamental wave light and the position of the fundamental wave light beam in order to make the fundamental wave light irradiated on the nonlinear optical crystal in a state that satisfies the phase matching conditions. The photodetector detects the intensity of the converted light that is output from the nonlinear optical crystal. The adjustment value calculating means calculates the adjustment value that corresponds to each of the plurality of adjustment means in the optical path adjusting portion, using fuzzy inference, from the value of the intensity of the converted light that is output from the light detection device. The optical path adjusting portion control device controls the plurality of adjustment means in the optical path adjusting portion based upon the adjustment values calculated by the adjustment value calculating means.

Effects of the Invention

According to the wavelength conversion device of the present invention, as described above, the structure is such that, by calculating an adjustment value that corresponds to each of the plurality of adjustment means in the optical path adjusting portion, relative to one piece of information being the intensity of the converted light from the nonlinear optical crystal, the stable maximization of the conversion efficiency is realized. That is, by detecting the intensity of the converted light at only one place, at the output portion of the wavelength conversion device, the adjustment value that corresponds to each of the plurality of adjustment means is calculated. When seen from the perspective of the adjustment value calculating means, this is a system that outputs a plurality of adjustment values corresponding to each of the plurality of adjustment means, for one input value being the intensity of converted light detected at a photodetector, that is, a one-input and multiple-output system. As a result, a detection location that detects the input value can be provided at only one location, so that the structure of the entirety of the wavelength conversion device can be made simple.

Additionally, according to the wavelength conversion device of the present invention, during the adjusting process of the optical system, no return-to-zero operation is needed.

This shall be explained in detail below, but this is due to this device being one that can realize a control method that is based upon fuzzy inference. As a result, even if, for some reason (e.g., backlash or the like), the optical path adjusting portion is not properly adjusted as in the control signal from the optical path adjusting portion control device, by a control signal being sent to the optical path adjusting portion again, alignment that satisfies the optimal conditions can be completed eventually.

Additionally, even if a crystal defect arises within a nonlinear optical crystal, it is possible to perform alignment so as to guide the light beam of the fundamental wave light to a separate location within the nonlinear optical crystal in order to generate a nonlinear optical effect by avoiding this defective portion. Crystal defects sometimes arise within nonlinear optical crystals due to the optical electric field of the fundamental wave light, and the desired nonlinear optical effect can not be generated at places where these defects have arisen. Therefore, these crystal defects must be avoided, and nonlinear optical effects should be generated at a separate place within the nonlinear optical crystal.

With PID control (Proportional, Integral and Derivative Control), it is generally difficult to change flexibly the place where nonlinear optical effects are generated within the nonlinear optical crystal, as described above. However, by carrying out alignment based upon fuzzy inference, it no longer becomes necessary for nonlinear optical effects to be generated in the same place within a nonlinear optical crystal, and as long as the conversion efficiency is maximized, a nonlinear optical effect can be realized at any place within the nonlinear optical crystal. Therefore, even if a crystal defect arises within the nonlinear optical crystal, wavelength conversion can be realized, so as a result, wavelength conversion devices can be made to last longer.

EXPLANATION OF REFERENCE NUMBERS

Figure 1:
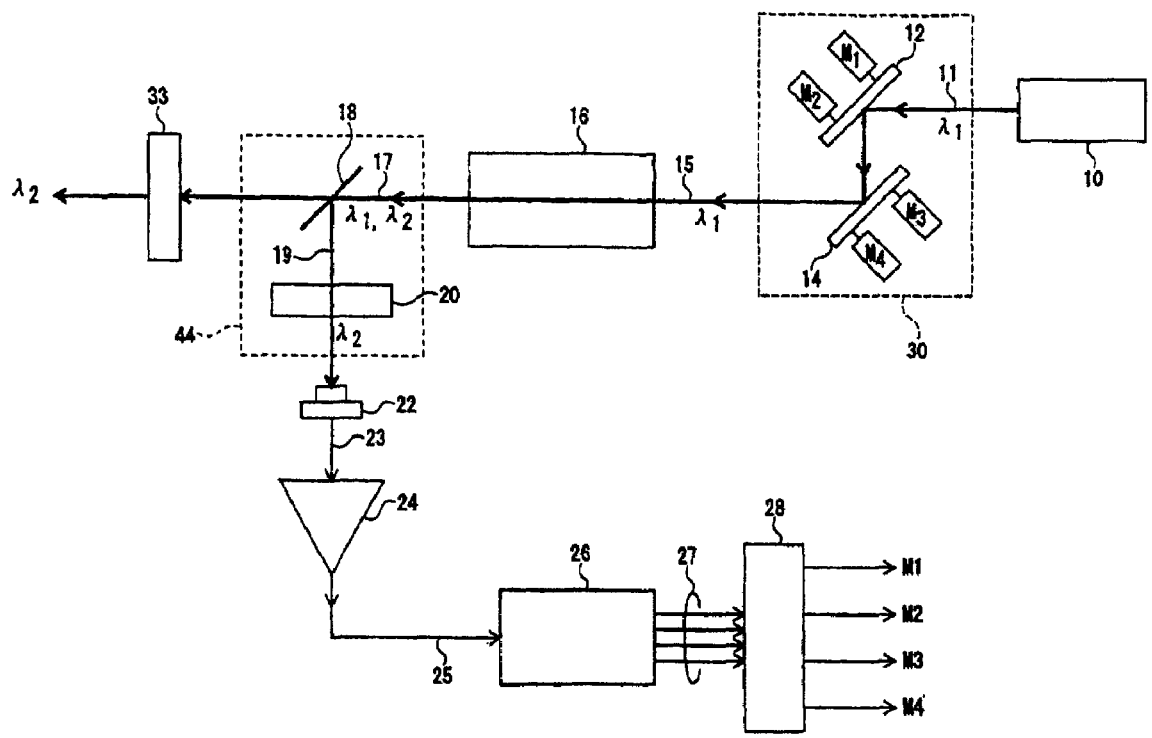
FIG. 1 Simplified block diagram of the wavelength conversion device of the present invention.

10: Laser Light Source
12: First Reflecting Mirror
14: Second Reflecting Mirror
16: Nonlinear Optical Crystal
18: Semitransparent Mirror
20: Wavelength Filter
22: Photodetector
24: Amplifier
26: Adjustment Value Calculating Means
28: Optical Path Adjusting Portion Control Device
30, 40: Optical Path Adjusting Portion
32, 34, 36, 38: Prism
44: Light Splitting Device

BEST MODE FOR EMBODYING THE INVENTION

Herebelow, an embodiment of the present invention shall be explained with reference to drawings. Each drawing merely shows, in a simplified manner, the shape, size, and relative positions of each of the constituent elements so that the present invention may be understood, and the present invention is not restricted to the examples shown in the drawings. Additionally, in the following explanation, specific materials and conditions and the like are used, but these materials and conditions are nothing more than preferred examples, and therefore the invention is not restricted to these. Additionally, in each drawing, similar constituent elements shall be shown with the same reference number, and regarding the functions and the like thereof, redundant explanations shall, at times, be eliminated. In the following drawings, optical paths shall be shown with thick lines, while the paths of electric signals shall be shown with thin lines. Additionally, if there is no explanation otherwise, the numbers assigned to these thick lines and thin lines shall refer respectively to the light beam that propagates through the optical path, or an electric signal.

Embodiment 1

Structure of Wavelength Conversion Device

The simplified structure of the wavelength conversion device of the present invention using SHG shall be explained with reference to FIG. 1. This wavelength conversion device is a device that converts a fundamental wave light having a wavelength of $\lambda_1$ into light having half of that wavelength $\lambda_2$ ($=\lambda_1/2$). This device is provided with a laser light source 10 that generates a fundamental wave light having a wavelength of $\lambda_1$, a nonlinear optical crystal 16 in which this fundamental wave light is made to enter and converted light having a wavelength of $\lambda_2$, differing from the wavelength of the fundamental wave light $\lambda_1$, is generated, and an optical path adjusting portion 30 that adjusts the direction of propagation of the fundamental wave light and the position of the light beam of the fundamental wave light in order to make this fundamental wave light enter the nonlinear optical crystal 16 in a state that satisfies the phase matching conditions.

The optical path adjusting portion 30 is provided with a first reflecting mirror 12 and a second reflecting mirror 14, and the first reflecting mirror 12 is provided with adjusting means driven by motors M1 and M2, and the second reflecting mirror 14 is provided with adjusting means driven by motors M3 and M4. The angle of incidence and the position at which the fundamental wave light 11 that is output from the laser light source 10 enters the nonlinear optical crystal 16 can be changed by the first reflecting mirror 12 and the second reflecting mirror 14, and thereby, the fundamental wave light can be made to enter the nonlinear optical crystal 16 at an angle that satisfies the phase matching conditions. The adjustment of the orientation of the first reflecting mirror 12 and the second reflecting mirror 14 can be carried out by the operation of the motors M1 through M4.

The fundamental wave light 15 that is adjusted so as to enter the nonlinear optical crystal 16 at an angle satisfying the phase matching conditions is made to generate a SH light (converted light) with an SHG, in the nonlinear optical crystal 16. The SH light is output, as output light 17, from the nonlinear optical crystal 16 in the same direction as the fundamental wave light. That is, the output light 17 is a light beam that is a mixture of the fundamental wave light having a wavelength of $\lambda_1$ and the SH light having a wavelength of $\lambda_2$. Therefore, when outputting only SH light with a wavelength of $\lambda_2$, that is, converted light, it is necessary to select and output only the SH light with a wavelength of $\lambda_2$ by using a wavelength filter that blocks the fundamental wave light having a wavelength of $\lambda_1$, and transmits only the SH light having a wavelength of $\lambda_2$. In FIG. 1, a wavelength filter for this purpose is set up as a wavelength filter 20 between a photodetector 22 and a semi transparent mirror 18.

The output light 17 that is output from the nonlinear optical crystal 16 has one portion split off for monitoring by using the semi transparent mirror 18, and this split off light beam is photoelectrically converted by the photodetector (e.g., a photodiode) 22 that is a photoelectric converter. The structure is such that, before entering the photodetector 22, the output light 17 that is a light beam which is a mixture of the fundamental wave light having a wavelength of $\lambda_1$ and the SH light having a wavelength of $\lambda_2$, is filtered, and only the SH light having a wavelength of $\lambda_2$ is selected and made to enter the photodetector 22. A light splitting device 44 comprises this semi transparent mirror 18 and the wavelength filter 20.

With the constitution described above, the intensity of the SH light that is converted light and which has a wavelength of $\lambda_2$ that is output from the nonlinear optical crystal 16 can be detected. That is, an electrical signal 23 that is proportional to the intensity of the SH light that is converted light and which has a wavelength of $\lambda_2$ can be obtained by the photodetector 22. The constitution is such that this electrical signal 23 is amplified as necessary by an amplifier 24 and output as an electrical signal 25, and then input into adjustment value calculating means 26. Since the electrical signal 23 is an extremely weak signal in some cases, amplification is necessary to such a degree that the strength of the noise that mixes with the electrical signal 23 during optical path adjustment control by fuzzy inference, as shall be explained, does not become a problem.

In the adjustment value calculating means 26, the driving amounts for the motors M1 through M4 that are necessary for adjusting the orientation of the reflecting surfaces of the first reflecting mirror 12 and the second reflecting mirror 14 in the optical path adjusting portion 30 are calculated and output as output signals 27, and this output signals 27 are input into an optical path adjusting portion control device 28. The output signals 27 are output, having been put into correspondence with values that respectively correspond to the motors M1 through M4 as shown in FIG. 1. The optical path adjusting portion control device 28 sends driving signals to the motors M1 through M4 respectively, based upon the output signals 27. This indicates that in FIG. 1, the arrows labeled M1 through M4 are respectively the signals that are sent to the motors M1 through M4 in the optical path adjusting portion 30.

Figure 2:
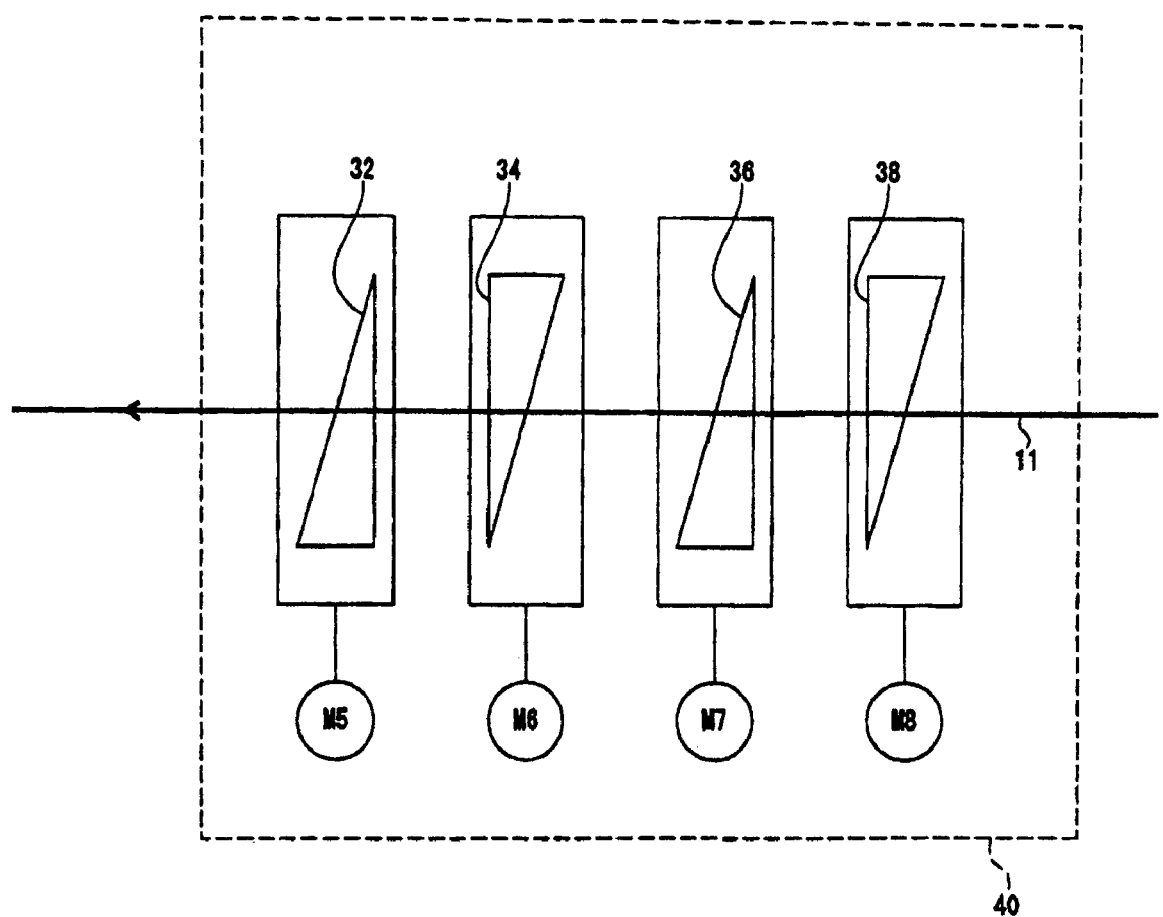
FIG. 2 Simplified block diagram of the optical path adjusting portion.

In the wavelength conversion device explained with reference to FIG. 1, the constitution is such that the optical path adjusting portion 30 is provided with the first reflecting mirror 12 and the second reflecting mirror 14, but this is not restricted to this constitution. For example, the optical path adjusting portion 30 can be constituted so as to be an optical path adjusting portion 40 having the structure shown in FIG. 2. This optical path adjusting portion 40 having the structure shown in FIG. 2 is constituted in such a way that instead of the first reflecting mirror 12 and second reflecting mirror 14 used for constituting the optical path adjusting portion 30, it is constituted in such a way that four prisms 32, 34, 36, and 38 are aligned in a straight line. The constitution is such that the four prisms 32, 34, 36, and 38 respectively can be made to rotate by motors M5 through M8, centered on the optical axis being the center of propagation of the fundamental wave light 11 output from the laser light source 10 (this optical axis is labeled 11 in FIG. 2).

By means of this constitution, by appropriately rotating the motors M5 through M8, the optical path can be adjusted, similarly with the direction of propagation of the fundamental wave light 11 being adjustable with the two reflecting mirrors 12 and 14 that constitute the optical path adjusting portion 30 described above. The advantage of the optical path adjusting portion 40 relative to the optical path adjusting portion 30 is the following point. In the optical path adjusting portion 40, even if the four prisms 32, 34, 36, and 38 are rotated for over one revolution around the optical axis 11 being the center of propagation of the fundamental wave light, there are no functional difficulties. That is, the angle of rotation can be restricted to the range from 0 to $2\pi$, but even without this restriction, the same effects can be obtained by a rotation over the range of from $2\pi$ to $4\pi$, so that even if for some reason the range can not be set between 0 to $2\pi$, the same effects can be obtained in the range from $2\pi$ to $4\pi$. For this reason, when conducting the optical path adjusting of the fundamental wave light, it is not necessary to restrict the setting positions of the angle of rotation of the four prisms 32, 34, 36, and 38 to the range of 0 to $2\pi$. This is a very useful point when designing the optical path adjusting portion.

In contrast, it is necessary to restrict the range of the orientation of the reflecting surface of the first reflecting mirror 12 and the second reflecting mirror 14 in the optical path adjusting portion 30. This is because, generally, no structure can be produced where the reflecting surfaces of the first reflecting mirror 12 and the second reflecting mirror 14 can be rotated any number of times.

Optical Path Adjusting Function of the Wavelength Conversion Device

Figure 3:
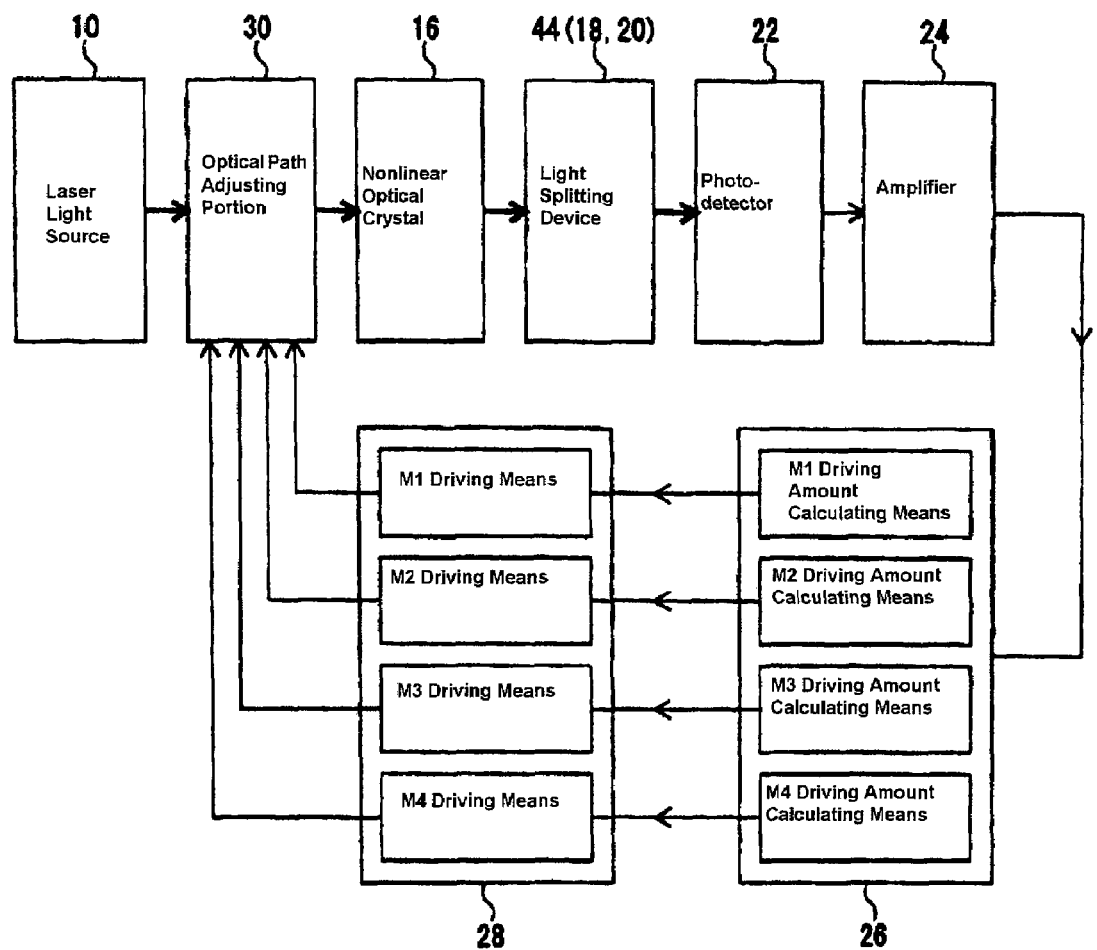
FIG. 3 Simplified block diagram for reference with respect to explanation of optical path adjusting function of the wavelength conversion device of the present invention.

The optical path adjusting function of the wavelength conversion device of the present invention shall be explained in order, with reference to FIG. 3.

(1) The optical path of incidence of the fundamental wave light output from the laser light source 10 is adjusted by adjusting the angle of incidence and position of incidence into a nonlinear optical crystal 16 with the optical path adjusting portion 30. The optical path adjusting function of the optical path adjusting portion 30 is started from the arbitrary set position of the first and the second reflecting mirrors immediately prior to the start of operation of the wavelength conversion device. That is, it is not the case that, at the start, prior to the start of the optical path adjustment of the fundamental wave light using the optical path adjusting portion 30, the first and the second reflecting mirrors are moved back to some standard set position.

(2) When the fundamental wave light is input into the nonlinear optical crystal 16 under conditions that satisfy the phase matching conditions by the optical path adjusting portion 30, the SH light being converted light is generated by the SHG within the nonlinear optical crystal 16. Therefore, the fundamental wave light and the SH light are output from the nonlinear optical crystal 16.

(3) The output light from the nonlinear optical crystal 16 has the SH light portion taken out by splitting, using the light splitting device comprising the semi transparent mirror 18 and the wavelength filter 20, and the SH light is input into a photodetector 22. This is converted, by a photodetector 22, into an electrical signal proportional to the intensity of the SH light that was taken out by splitting. The electrical signal output from the photodetector 22 that is proportional to the intensity of the SH light is generally weak in intensity, so it is amplified by a amplifier 24, and then input into the adjustment value calculating means 26.

(4) The adjustment value calculating means 26, calculates the respective amounts of rotation (adjustment values) for the motors M1 through M4 using fuzzy inference, based upon the electrical signal amplified by the amplifier 24 and then input. The way in which the amount of rotation of the motors M1 through M4 are calculated using fuzzy inference shall be explained below. The amounts of rotation of the motors M1 through M4 calculated by the adjustment value calculating means 26 are sent to the optical path adjusting portion control device 28 that controls the motors M1 through M4, and the motors M1 through M4 are driven by the M1 through M4 driving means. By the motors M1 through M4 being driven as described above, the orientations of the respective reflecting surfaces of the first and the second reflecting mirrors are adjusted, and the incident optical path of the fundamental wave light into the optical crystal 16 is adjusted.

(5) After the incident optical path of the fundamental wave light into the nonlinear optical crystal 16 is adjusted in the step described in (4), the adjustments to the incident optical path of the fundamental wave light into the nonlinear optical crystal described above are repeated until the intensity of the SH light detected by the photodetector 22 becomes the maximum intensity.

Figure 4:
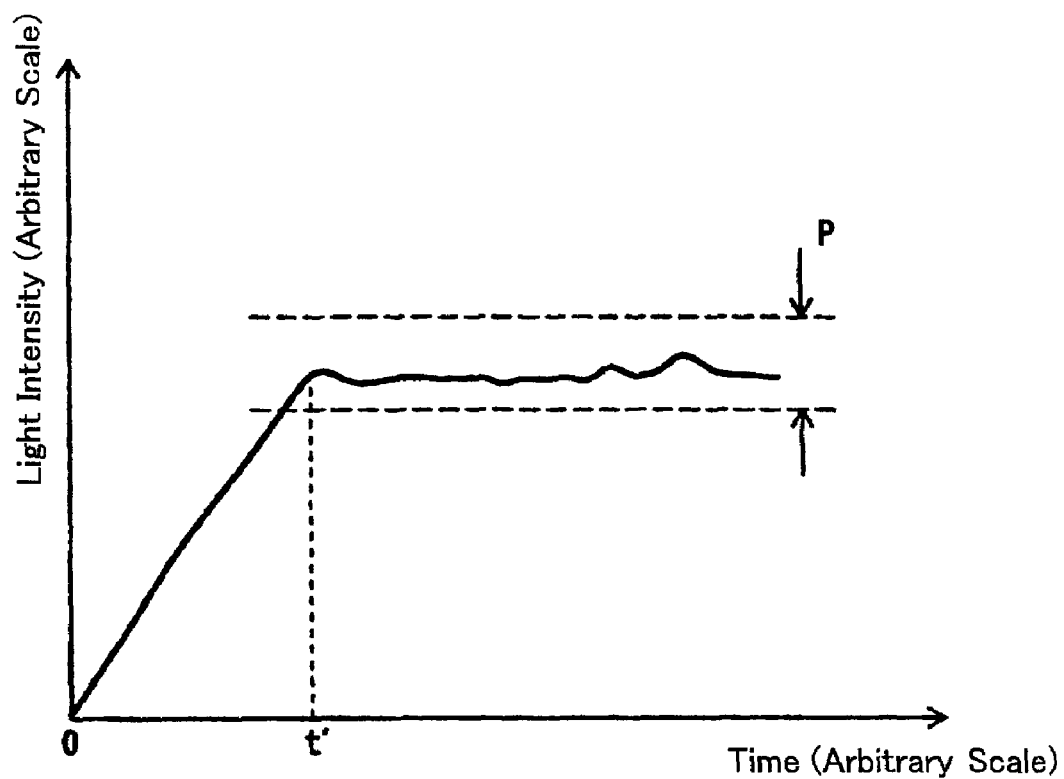
FIG. 4 Diagram for reference with respect to explanation of change in intensity of converted light.

FIG. 4 is a graph qualitatively depicting the change over time of the intensity of the converted light as a result of performing control so that the intensity of the converted light stabilizes at the maximum value, by adjusting the optical path of the fundamental wave light in the optical path adjusting portion 30. The horizontal axis and the vertical axis are arbitrarily scaled in units of time and intensity of converted light, respectively.

As a result of having performed the steps explained in (1) through (5) described above, the intensity of the converted light reaches a maximum value at t' after the time of the start of operation of the wavelength conversion device, and thereafter, as long as it fluctuates within a permissible range that is set as permissible as changes in intensity of the converted light (the range between the arrows and labeled P within FIG. 4), it is considered that the output intensity of the wavelength conversion device has been stabilized. In order to make output intensity stable, it suffices to continue performing the steps explained above in (1) through (5) throughout the time this wavelength conversion device is being operated.

Next, the steps explained in (1) through (5) above shall be explained in greater detail with reference to the flowchart shown in FIG. 5.

Step S-10: This step is the control start step. The control process for stabilizing the intensity of the converted light at a maximum value is started by instructions from the operator of this wavelength conversion device or a personal computer or the like.

Step S-12: In this step, the adjustment value calculating means 26 obtains the output from the photodetector 22. Exceptions are cases where an amplifier 24 is provided, in which case this is the step wherein the adjustment value calculating means 26 obtains the output from the amplifier 24. Hereinafter, in order to simplify matters, this shall be referred to as "output from the photodetector 22," but this shall also refer to the output from the amplifier 24 in cases where an amplifier 24 is provided. In this step, immediately after the control of the optical path of the fundamental wave light has started, the intensity of the converted light obtained by the photodetector 22 is measured.

Step S-14: In this step, the motors M1 through M4 are driven in order. One can start from any one of the motors M1 through M4, but first, one of these motors is selected. By changing the orientation of the reflecting surface of the first reflecting mirror 12 by the motor that is selected first (here, we shall assume it is M1), the rotation of the motor M1 is fixed at a position whereat the intensity of the converted light becomes maximized, and by similarly changing the orientation of the reflecting surface of the first reflecting mirror 12 with the next motor (here, we shall assume it is M2), the rotation of the motor M2 is fixed at a position whereat the intensity of the converted light becomes maximized. Similarly, by changing the orientation of the reflecting surface of the second reflecting mirror 14 by the motors M3 and M4, the rotation of the motors M3 and M4 are fixed so that the orientation of the reflecting surface of the second reflecting mirror 14 is fixed at a position whereat the intensity of the converted light becomes maximized.

The amount of rotation of the motors M1 through M4 described above for controlling the orientation of the reflective surface of the first reflecting mirror 12 and the second reflecting mirror 14 is determined based upon fuzzy inference which shall be explained below. The algorithm for fuzzy inference used here does not change fundamentally whether the amount of rotation of the motors M1 through M4 is calculated for controlling the orientation of the reflecting surfaces of the first reflecting mirror 12 and the second reflecting mirror 14, as described above, or whether the respective amounts of rotation of four prisms are calculated in cases where the intensity of the converted light is set at a maximum value by rotating four prisms as explained with reference to FIG. 2. That is, it will merely be the case that there will be differences in the values of the parameters that determine the amount of rotation of the motors M1 through M4, and the parameters that determine the respective amounts of rotation of the four prisms, but regarding the algorithm itself, for each of the cases, the same one can be used. Therefore, regarding the explanation that follows concerning the flowchart shown in FIG. 5, the amounts of rotation of the motors M1 through M4 shall be explained as parameters.

Step S-16: This step is a test driving step where the motors M1 through M4 are rotated a small amount. This is performed in this step in order to determine the direction of rotation of the motor.

Step S-18: In this step, a signal that is proportional to the intensity of the converted light is obtained by a photodetector 22.

In the steps S-16 and S-18 described above, if, by rotating a motor in a certain direction, it is found that the intensity of the converted light received by the photodetector 22 increases, this shows that this direction of rotation is a direction in which the intensity of converted light is maximized. If, on the contrary, it is found that the intensity of converted light received by the photodetector 22 decreases, then this shows that this direction is the opposite direction from the direction in which the intensity of converted light is maximized.

Step S-20: In this step, the time derivative value of the output signal from the photodetector 22, and the amount of deviation from the target value (maximum value) is calculated. In this step, the amount of deviation from the target value (maximum value) and the time derivative (difference) value of the output signal that are used as the input values in fuzzy inference are calculated. If the value of the output signal from the photodetector 22 at time $t_1$ is designated $s_1$, and the value of the output signal at time $t_2$ is designated $s_2$, then assuming that $t_1<t_2$, the time difference value S' of the output signal is given by $S'=(s_2-s_1)/(t_2-t_1)$, and additionally, the amount of deviation from the target value (proportion of deviation from target value) $\Delta S$, given by $\Delta S=(s_1/s_0)-1$, where the target value (maximum value) is designated so, is calculated. Fuzzy inference is carried out using S' and $\Delta S$.

Step S-22: In this step, the driving amount (amount of rotation) of the motor due to fuzzy inference is calculated. The details shall be described below, but in this step, using the values for S' and $\Delta S$ described above, fuzzy inference is carried out, thereby calculating the absolute value M of the driving amount (amount of rotation) of the motor.

Step S-24: In this step, the driving direction (direction of rotation) of the motor is determined. If the value of S' determined in the step S-20 described above is negative, then it is necessary to reverse the driving direction (direction of rotation) of the motor. On the other hand, if the value of S' is positive, then this means that the direction of rotation of the motor may be kept as it is. In this step, the direction of rotation of the motor described above is determined by the following procedure. That is, the parameter for determining the direction of rotation of the motor shall be designated $\alpha$. $\alpha$ can take on the value 1 or the value −1. Additionally, the parameter $\delta$ is defined in the following way. If the value of S' determined in step S-20 described above is negative, then $\delta=-1$, and if the value of S' is positive, then $\delta=1$. Then, the next direction of rotation of the motor shall be given by $\alpha\times\delta$. That is, the next direction of rotation of the motor is determined by setting the next, new value of the parameter $\alpha$ given by (former) $\alpha\times\delta$. If the amount of rotation is represented, including the direction of rotation of the motor, then this will be represented by $\alpha\times M$.

Step S-26: In this step, the motor is driven, and the motor is rotated by the amount $\alpha\times M$ described above.

Step S-28: In this step, similarly with the step S-18 described above, a signal proportional to the intensity of the converted light is obtained by a photodetector 22.

Step S-30: In this step, a judgment is made whether or not to end the adjustment of the motor that was controlled and adjusted in the foregoing steps, based upon the value of the signal that is proportional to the intensity of the converted light, obtained in step S-28 described above, and move on to the step wherein the next motor is controlled. If the value of the signal that is proportional to the intensity of the converted light, obtained in step S-28 described above, is within a range (the range of values between arrows and labeled P in FIG. 4) that is considered to be the target value (maximum value), then the motor that is to be controlled is changed in order to perform control of the next motor. In this case, the procedure advances to the next step S-32. On the other hand, if it is judged that the value of the signal that is proportional to the intensity of the converted light, obtained in step S-28, has not reached the target value, then the procedure returns to step S-20.

Step S-32: In this step, it is judged whether or not to stop the adjustment task in the optical path adjusting portion 30. If it is confirmed that the adjustment tasks for the motors M1 through M4 are all finished, then the procedure advances to the next step S-34, and the adjustment task is finished. On the other hand, if the adjustment tasks are not finished and control must be continued, then the procedure returns to the above-described step S-14. Even if it is confirmed that the adjustment tasks for the motors M1 through M4 described above have all finished, in order to respond to temporal changes, during this wavelength conversion device is being driven, there is the possibility to judge that the adjustment task in the optical path adjusting portion 30 is not to be finished.

Step S-34: In this step, the adjustment task in the optical path adjusting portion 30 is finished.

Fuzzy Inference

The membership functions used in the fuzzy inference carried out in this light conversion device shall be explained with reference to FIG. 6, (A1) through (A4) and (B1) through (B4), and FIG. 7, (A1) through (A3) and (B1) through (B3). Hereinafter, in cases where all of the figures of FIG. 6, (A1) through (A4) and (B1) through (B4) are being referred to, we shall simply write "FIG. 6." Additionally, similarly, in cases where all of the figures of FIG. 7, (A1) through (A3) and (B1) through (B3) are being referred to, we shall simply write "FIG. 7."

Figure 6:
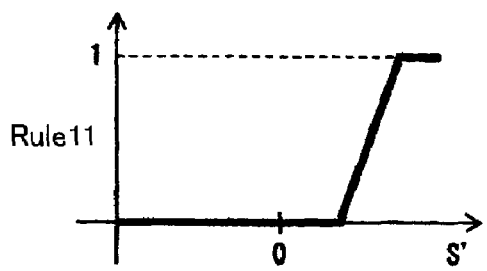
FIG. 6 Diagram representing membership function relative to S'.
Figure 6:
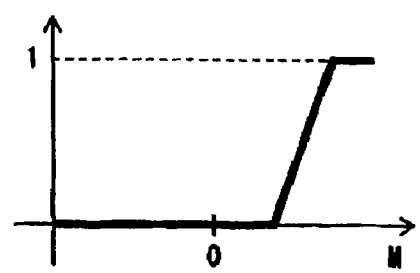
Figure 6:
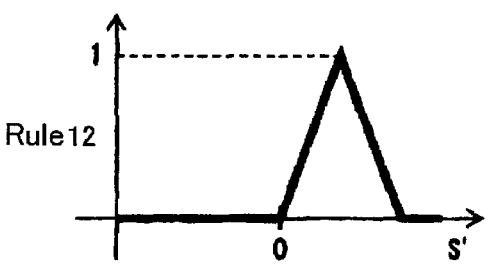
Figure 6:
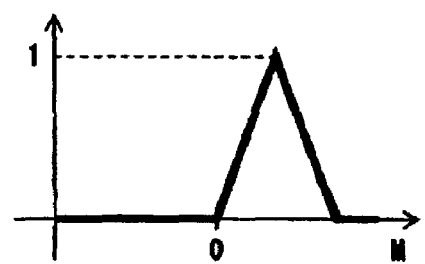
Figure 6:
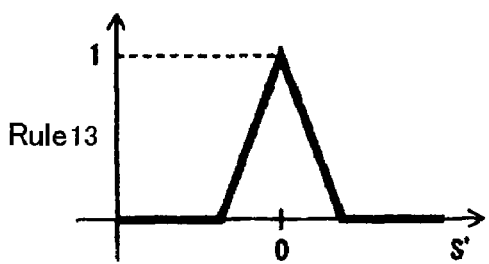
Figure 6:
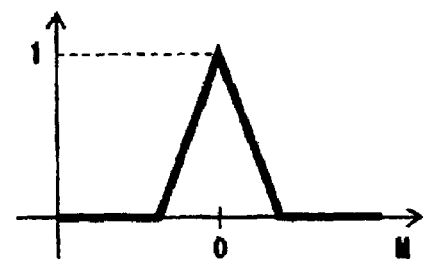
Figure 6:
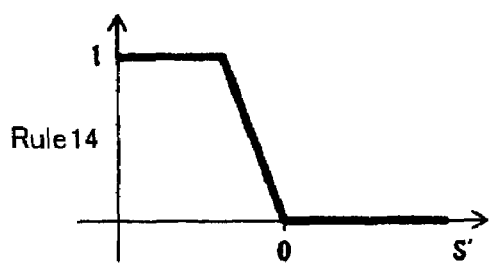
Figure 6:
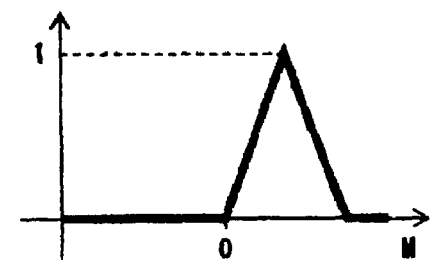

FIG. 6 is a diagram showing the membership functions relative to the time derivative (difference) value S' of the output signal that is detected by the photodetector 22. FIG. 7 is a diagram showing the membership functions relative to the amount of deviation from the target value $\Delta S$ of the output signal that is detected by the photodetector 22. (A1) through (A4) as indicated in FIG. 6 indicate the antecedents of the fuzzy inference, and (B1) through (B4) indicate the consequents respectively corresponding to the antecedents (A1) through (A4). Additionally, similarly, in FIG. 7, (A1) through (A3) indicate the antecedents of the fuzzy inference, and (B1) through (B3) indicate the consequents respectively corresponding to the antecedents (A1) through (A3).

If optical path adjustment is performed in the optical path adjusting portion 30, then since the angle of incidence of the fundamental wave light into the nonlinear optical crystal changes, conditions become farther and nearer to the phase matching conditions. Therefore, the intensity of the converted light fluctuates over time. As described above, this temporal change in the intensity is observed by the photodetector 22. The temporal change of the intensity observed by the photodetector 22 is represented by the time difference value S' of the output signal, that is, $S'=(s_2-s_1)/(t_2-t_1)$.

Therefore, the membership functions that are to form the basis of the fuzzy inference are defined so as to obey the following rules (hereinafter may be called "fuzzy rules").

Rule 11: If S' has a positive value, and its value is large, then the absolute value of the amount of rotation of the motor is large.

Rule 12: If S' has a positive value and its value is small, then the absolute value of the amount of rotation of the motor is small.

Rule 13: If S' has the value of 0, then the absolute value of the amount of rotation of the motor is 0.

Rule 14: If S' has a negative value, then the absolute value of the amount of rotation of the motor is small.

The rules described above shall be explained visually, with reference to FIG. 6. (A1) through (A4) shown in FIG. 6 respectively represent the antecedents of rules 11 through 14 of the fuzzy rules described above. In FIG. 6 (A1) through (A4), the horizontal axis indicates S', and the vertical axis indicates the degree of matching (the range of values being between 0 and 1). On the other hand, (B1) through (B4) shown in FIG. 6 respectively represent the consequents of rules 11 through 14 of the fuzzy rules described above. The horizontal axis represents the absolute value M of the driving amount (amount of rotation) of the motor, and the vertical axis represents the degree of matching.

Next, regarding the case where the target value of the output signal value of the photodetector 22 is close to the maximum output value, the membership functions for $\Delta S$, given by $\Delta S=(s_1/s_0)-1$, where the target value (maximum value) is $s_0$, shall be explained. Here, $s_1$ is the value of the output signal at time $t_1$. The reasons for using membership function for $\Delta S$ are the following two points.

First, the first point shall be explained. The fundamental wave light that is made to enter the nonlinear optical crystal 16 and the converted light that is emitted from the nonlinear optical crystal 16 are Gaussian beams. Due to the properties of Gaussian beams, the value of the derivative of the intensity of the beam in the radial direction in the vicinity of the center is small. And the value of the derivative of the intensity of the beam in the radial direction is also small at places sufficiently far from the center of the beam. That is, when the angle of incidence of the fundamental wave light into the nonlinear optical crystal 16 almost matches the phase matching conditions (when the alignment is done almost exactly), and when it is greatly out of place (when the alignment is off by a large amount), in both cases, the effects of adjustment of the optical path of the fundamental wave light performed in the optical path adjusting portion 30 becomes approximately the same, the effects being small. In other words, the amount of change of the intensity of the converted light detected by the photodetector 22, relative to unit changes in the orientation of the reflecting surfaces of the reflecting mirrors in order to adjust the optical path of the fundamental wave light in the optical path adjusting portion 30, or in the angle of rotation of the prisms, are small to approximately the same degree in both cases.

That is, if the alignment is off by a large amount, then the absolute value of the angle of rotation of the motor ought to be set so as to be large, but if fuzzy inference is performed using only the rules 11 through 14 described above, then the angle of rotation of the motor will be calculated to be too small. Therefore, by setting new rules for membership functions for $\Delta S$, the value of the angle of rotation of the motor can be optimized. However, even without setting this new rule, the adjustment of the optical system can be performed. The only problem is that since the value of the calculated angle of rotation of the motor is small, the time it takes until the optical system is adjusted to a more optimal state will be longer (since the number of control steps will be greater).

Next, the second point shall be explained. When some kind of noise gets mixed into the intensity of the converted light that is detected by the photodetector 22, by setting the new rules as described above, resistance of the optical path adjusting function against noise can be increased. If noise gets mixed into the intensity of the converted light detected by the photodetector 22, then the value of S' specifically becomes a large value. Therefore, if there were only the rules 11 through 14, and no other new rules are set up, then when the value of the angle of rotation of the motor is calculated to be a value that is inappropriately large, there is the possibility that appropriate control can no longer be done.

Therefore, by setting up the new rules shown below, even if it happens that noise should get mixed into the intensity of the converted light, the possibility described above can be eliminated.

Therefore, regarding the membership functions for $\Delta S$ that form the basis of the fuzzy inference, they shall be defined so as to obey the following fuzzy rules (new rules).

Rule 21: If the intensity signal detected by the photodetector is much smaller than the target value (maximum value) (the value of $\Delta S$ is a negative value and the absolute value thereof is large), then the angle of rotation of the motor is large.

Rule 22: If the intensity signal detected by the photodetector is approximately the same as the target value (maximum value) (the value of $\Delta S$ is a negative value and the absolute value thereof is small), then the angle of rotation of the motor is small.

Rule 23: If the intensity signal detected by the photodetector is equal to or greater than the target value (maximum value) $s_0$ (the value of $\Delta S$ is greater than 0), then the angle of rotation of the motor is 0.

Figure 7:
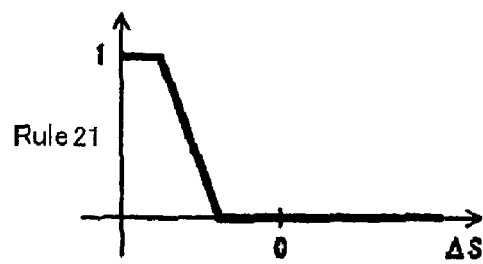
FIG. 7 Diagram representing membership function relative to ΔS.
Figure 7:
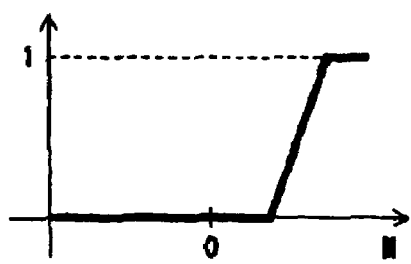
Figure 7:
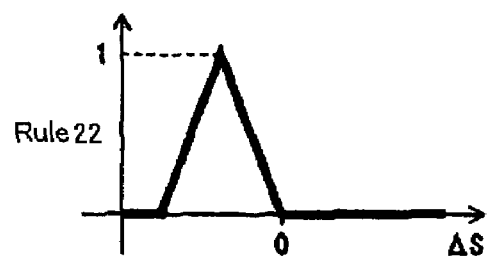
Figure 7:
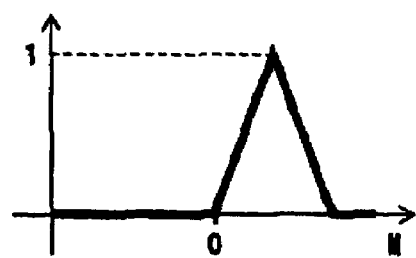
Figure 7:
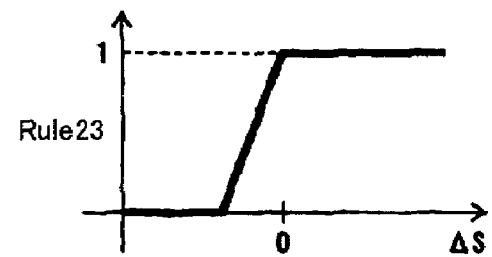
Figure 7:
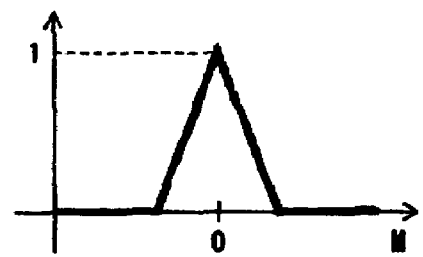

The new rules described above shall be explained visually with reference to FIG. 7. (A1) through (A3), shown in FIG. 7, respectively represent the antecedents of rules 21 through 23 of the fuzzy rules describe above. In (A1) through (A3), the horizontal axis indicates $\Delta S$, and the vertical axis indicates the degree of matching (within the range of values between 0 and 1). On the other hand, (B1) through (B3) indicated in FIG. 7 respectively represent the consequents of the rules 21 through 23 of the fuzzy rules described above. The horizontal axis represents the absolute value M of the driving amount (amount of rotation) of the motor, and the vertical axis represents the degree of matching.

As a method for calculating the driving amount (amount of rotation) of the motors using fuzzy inference, here, we shall use the min-max composition center of gravity method. If the intensity of the converted light is detected by a photodetector, then S' and $\Delta S$ are determined based upon that value. This shall be explained for a hypothetical case in which S' and $\Delta S$ have been determined to be $S'_1$ and $\Delta S_1$.

Figure 8:
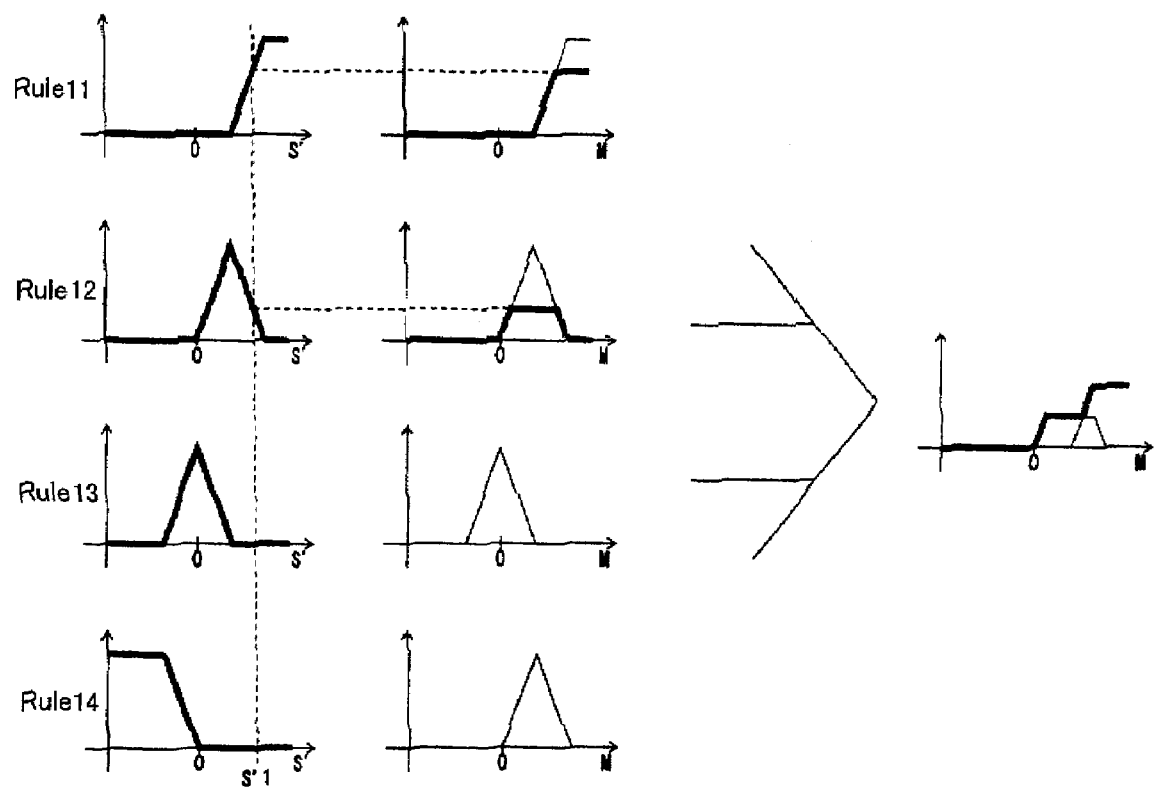
FIG. 8 Diagram for reference with respect to explanation of process of aggregation based upon rules 11 through 14.

FIG. 8 is a diagram for the explanation of the procedure for aggregation based upon rules 11 through 14. In this FIG. 8, for the membership functions corresponding to rules 11 through 14, we shall use the same membership functions as those shown in FIG. 6.

Since $S'=S'_1$, in the diagram that indicates the antecedents of the membership functions that correspond to rules 11 through 14 shown in FIG. 8, the location corresponding to $S'_1$ on the horizontal axis representing S' is indicated with a vertical dotted line. As can be seen from this diagram, in rule 13 and rule 14 described above, since the degree of matching of the antecedent is 0, the consequent is also 0. In rule 11 and rule 12 described above, since the degree of matching is not 0, the membership function of the consequent is clipped in correspondence with the degree of matching thereof. As a result, fuzzy inference of rules 11 through 14 is performed, and as a result, the logical sum of the consequents that are represented as aggregation 1 in FIG. 8 is determined. Further, the function that indicates the logical sum of the consequents represented as aggregation 1 is determined by composition of membership functions on which clipping of the consequents of rule 11 and rule 12 has been done.

Figure 9:
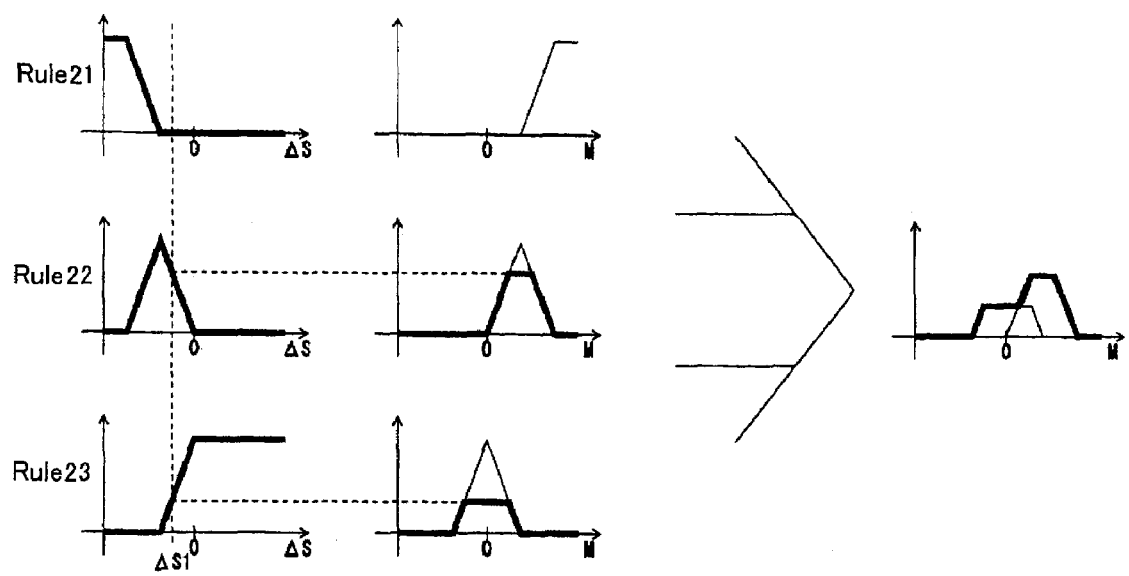
FIG. 9 Diagram for reference with respect to explanation of process of aggregation based upon rules 21 through 23.

FIG. 9 is a diagram for the explanation of the procedure for aggregation based upon rules 21 through 23. In this diagram, for the membership functions corresponding to rules 21 through 23, we shall use the same membership functions as those shown in FIG. 7.

Since $\Delta S=\Delta S_1$, in the diagram that indicates the antecedents of the membership functions that correspond to rules 21 through 23 shown in FIG. 9, the location corresponding to $\Delta S_1$ on the horizontal axis representing $\Delta S$ is indicated with a vertical dotted line. As can be seen from this diagram, since the degree of matching of rule 21 described above is 0, the consequent is also 0. In rule 22 and rule 23 described above, since the degree of matching is not 0, the membership function of the consequent is clipped in correspondence with the degree of matching thereof. As a result, fuzzy inference of rules 21 through 23 is performed, and as a result, the logical sum of the consequents that is represented as aggregation 2 in FIG. 9 is determined. Further, the function that indicates the logical sum of the consequents represented as aggregation 2 is determined by composition of membership functions on which clipping of the consequents of rule 22 and rule 23 has been done.

Next, processing is performed that adds weighting, such as how significant rules 21 through 23 (hereinafter may be called "second rule series") are relative to rules 11 through 14 (hereinafter may be called "first rule series"), or whether the first and the second rule series are to be equally significant. By multiplying the results obtained by aggregation 1 and aggregation 2 described above (composition membership functions determined as the logical sum of the consequents, represented as aggregation 1 and aggregation 2 respectively in FIG. 8 and FIG. 9), by r and (1−r) respectively, weighting is done for the respective functions, and as shown in FIG. 10(A) through (D), they are both aggregated.

Here, r is a real number in the range of values of 0 to 1. For example, if r=1 is selected, then this corresponds to only the first rule series being taken into account, and the second rule series being ignored. Additionally, if r=0.5 is selected, then this means that the first rule series and the second rule series are treated equally. Additionally, if r=0 is selected, this corresponds to only the second rule series being taken into account, and the first rule series being ignored.

Figure 10:
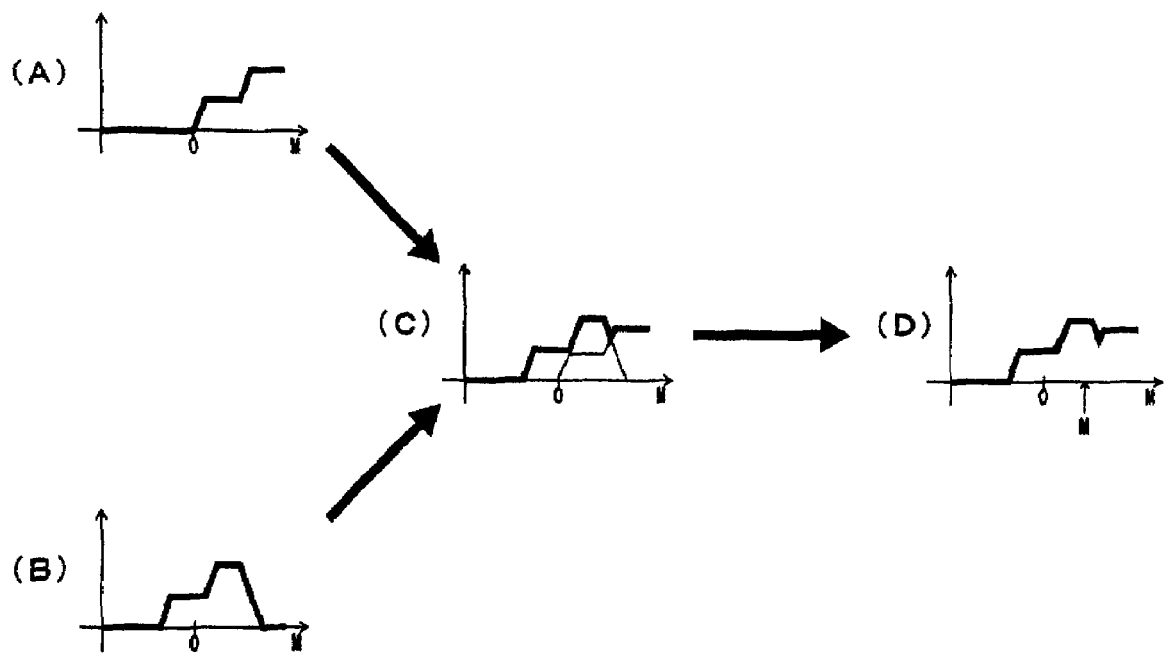
FIG. 10 Diagram for reference with respect to explanation of process of determining Aggregation 3 as the logical sum of the membership functions of Aggregation 1 and Aggregation 2.

FIG. 10, (A) through (D) are diagrams for the explanation of the procedure for determining aggregation 3, as the logical sum of the membership functions of aggregation 1 and aggregation 2, by aggregating the composition membership functions determined as the logical sum of the consequents, represented as aggregation 1 and aggregation 2 respectively in FIG. 8 and FIG. 9 described above. FIG. 10(A) shows the simplified shape of the composition membership function determined to be aggregation 1, and FIG. 10(B) shows the simplified shape of the composition membership function determined to be aggregation 2. FIG. 10(C) shows the simplified shape of the membership function as aggregation 3 composed by the composition membership function determined as aggregation 1 multiplied by r, and the composition membership function determined as aggregation 2 multiplied by (1−r). FIG. 10(D) shows a diagram explaining a procedure whereby the values of the composition center of gravity of the membership functions given in FIG. 10(C) are determined, and this value for the composition center of gravity is used as the driving amount of the motor (angle of rotation). In FIG. 10(D), the value on the horizontal axis labeled with an arrow and M is the position of the composition center of gravity determined by the membership functions indicated by FIG. 10(C), and this position indicates the angle of rotation of the motor.

That is, it can be seen that, by performing fuzzy inference as described above, the angle of rotation of the motor to be driven, in order to change the angle of the reflecting surface of the reflecting mirror and the like, in order to adjust the optical path of the fundamental wave light, can be determined.

In the explanation given above, each of the rules of rule 11 through 14, being the first rule series, and each of the rules of rule 21 through 23, being the second rule series, was treated equally, but it is possible to weight how much significance each of these rules shall have. In this case, it is sufficient to conduct aggregation while multiplying a parameter that corresponds to r described above to the membership functions that correspond to each of the rules of rule 11 through 14, being the first rule series, or each of the rules of rule 21 through 23, being the second rule series.

Additionally, in the fuzzy inference described above, the value of the angle of rotation of the motor was determined using the min-max composition center of gravity method, but there is no restriction to this method, and it is possible to utilize other methods that are known as methods for fuzzy inference, such as the product-sum-gravity method. Regarding which method is to be used, the most optimal method may be used based upon experience and the like, for each of the wavelength conversion devices that are to be controlled with fuzzy inference.

Next, parameters for the first rule series and the second rule series used in the fuzzy inference described above are shown in table 1 and table 2. As is obvious from the parameters shown in table 1, there are no particularly complex fuzzy rules. Even so, it was confirmed that by performing the controls based upon the fuzzy inference described above, the alignment of the optical system of the wavelength conversion device can be easily realized.

TABLE 1

Relationship among value of time derivative of photodetector, absolute value of driving amount, and rotation and reversal parameter

| Rule Number | Value of Derivative of Sensor | Absolute Value of Driving Amount | Rotation and Reversal δ |
|---|---|---|---|
| 11 | LP | LP | +1 |
| 12 | SP | SP | +1 |
| 13 | ZE | ZE | +1 |
| 14 | NE | SP | −1 |

TABLE 2

Relationship between ratio ΔS to target output and absolute value of driving amount

| Rule Number | ΔS | Absolute Value of Driving Amount |
|---|---|---|
| 21 | NL | LP |
| 22 | NS | SP |
| 23 | ZP | ZE |

The contents shown in table 1 and table 2 are mathematically the same values as the ones represented respectively by the membership functions shown in FIG. 6 and FIG. 7. Here, the meaning of the parameters shown in table 1 and table 2 is as follows. LP: large positive value, SP: small positive value, ZE: 0, NE: negative value, NL: negative value with a large absolute value, NS: negative value with a small absolute value, ZP: 0 or positive value.

From the explanation given above, it can be seen that in the adjusting procedure of the optical system of the wavelength conversion device of the present invention, there is no need for a so-called return-to-zero operation. This is because the values that are used as the basis for the fuzzy inference described above are only the time difference value S' of the output signal of the photodetector, given by $S'=(s_2-s_1)/(t_2-t_1)$ and the amount of deviation from the target value ΔS, given by $\Delta S=(s_1/s_0)-1$ where the target value (maximum value) is $s_0$. That is, in order to obtain the values of S' and ΔS, both are values that can be determined without the need for a return-to-zero operation. As a result, to repeat, even if the optical path adjusting portion is not properly adjusted in accordance with the control signal from the optical path adjusting portion control device for some reason (e.g., backlash and the like), by a control signal being sent to the optical path adjusting portion again, alignment can eventually be completed that satisfies the optimal conditions.

Additionally, in the adjusting procedure for the optical system of the wavelength conversion device of the present invention, as described above, maximization of the conversion efficiency can be realized by the adjustment value calculating means calculating the optical path adjustment value that corresponds to each of the plurality of adjustment means that are performed in the optical path adjusting portion, relative to one piece of information, being the intensity of the converted light measured by the photodetector. That is, it can be seen that a wavelength conversion device with a simple constitution, provided with only one place that is a detection place for detecting the input value, can be realized.

Additionally, as described above, since this is a structure that adjusts the optical path using the values of S' and ΔS determined without the need for a so-called return-to-zero operation, even if a crystal defect should arise within the nonlinear optical crystal, it is possible to conduct alignment so as to guide the light beam of the fundamental wave light to a different place within the nonlinear optical crystal, so as to be able to avoid this defective portion and generate nonlinear optical effects. That is, there is no need to set the initial conditions that incident light is irradiating on a place where a crystal defect has arisen, by a return-to-zero operation.

Further, if optical path control is realized without using fuzzy inference, it becomes necessary to provide error correspondence processing (routine) and runaway prevention processing (routine) during the alignment task. The size of the program required to perform such error correspondence processing or runaway prevention processing requires processing equivalent to or greater than the fuzzy inference processing described above. Further, with regard to the design of the mechanism for the device, it is necessary to prepare means for runaway prevention such as a limiter switch. The means for runaway prevention is particularly important for the constitution of a laser device, and if runaway operation should occur, critical results such as damage to the optical crystal that is the laser activation medium may occur.

The fuzzy inference program disclosed in the embodiment described above is created based upon an extremely simple algorithm. Since it is based on a simple algorithm, due to the characteristics of the program, it is structured so that runaway of the wavelength conversion device does not easily occur. That is, by using fuzzy inference, the program can be made simple, and it is because fuzzy inference is used that a complex task can be performed with a simple algorithm.

Further, the performing of processing that carries out two types of judgments, for S' and ΔS, contributes to the suppression of the generation of the above-mentioned runaway state. If the alignment task is controlled using only one of the judgments of S' and ΔS, then with noise and the like mixed into the control signal as a cause, the danger of a runaway state being generated becomes great. When two types of judgment, of S' and ΔS, is carried out, factors that generate a runaway state must arise in both S' and ΔS, or the runaway state of the device will not be generated. Therefore, by performing processing that carries out the two types of judgments for S' and ΔS, the probability that a runaway state is generated can be made dramatically smaller.

Additionally, by assembling a wavelength conversion device by providing an optical path adjusting portion that is constituted using a prism shown in FIG. 2, the probability of the runaway state described above occurring can be made even smaller. A prism can only perform adjustment of the optical path in a restricted region. By designing so that this restricted region corresponds to a region wherein a runaway state does not arise, then even if the program enters a runaway state, the entire control system will never enter a runaway state.

As explained above, it can be seen that the wavelength conversion device of the present invention has a structure whereby it is difficult for a runaway state to occur, even when the control system is considered as a whole.

Additionally, in the wavelength conversion device described above, even if a plurality of possible maximum values of wavelength conversion efficiency exist, in the algorithm disclosed in the embodiments described above, only one maximum value is searched for. Therefore, in order to handle such cases, there is a method of setting the angle of rotation of the motor during the initial rotation (driving amount) randomly. That is, if the initial value is different, then the probability that different maximum values could be found becomes higher For this purpose, programming should be done so that the angle of rotation of the motor in step S-16 in the flowchart shown in FIG. 5 is set randomly.

Figure 5:
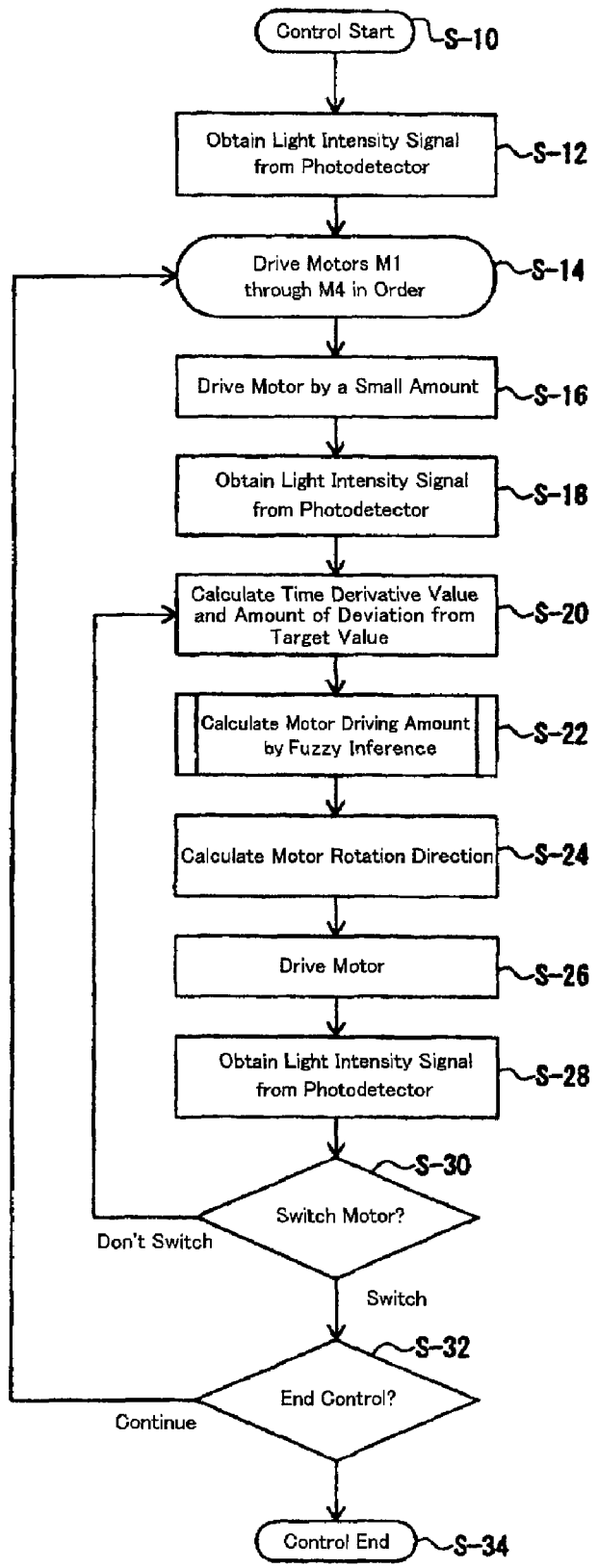
FIG. 5 Flowchart showing optical path adjusting steps based upon fuzzy inference.

Additionally, in the flowchart shown in FIG. 5, switching between the motors is done in order in step S-14. However, for the reasons described above, when a plurality of maximum values exists, only one particularly maximum value can be handled. Therefore, by switching the order of the motors being driven randomly, there is the possibility of being able to reach another maximum value. That is, whereas by randomly setting the angle of rotation of the motor described above, a different maximum value is searched for by changing the initial values, a different maximum value is searched for by randomly changing the order of the motors being driven.

When setting the angle of rotation of the motor randomly, or switching the order of the motors to be driven randomly, regarding the degree of randomness that is necessary, an optimal value thereof exists separately for each wavelength conversion device.

Of course, when a plurality of maximum values exist, it is possible that the maximum value that is found after the first maximum value being found is a smaller value. In this case, it suffices to program it so that it returns to the routine of step S-14. Additionally, when performing random setup as described above, the judgment of the termination of the control process in step S-32 becomes important. In this case, that program is created by determining a reasonable judgment baseline for each wavelength conversion device.

INDUSTRIAL APPLICABILITY

The embodiment described above is an embodiment concerning a wavelength conversion device based upon SHG. Here, the item that is adjusted using fuzzy inference is the adjustment of the angle of incidence when fundamental wave light enters a nonlinear optical crystal. That is, this adjustment is, as explained with reference to FIG. 1, adjustment for making the direction of propagation of fundamental wave light match the direction in which the phase matching conditions are satisfied in an optical path adjusting portion. As described above, it was confirmed that by detecting the intensity of converted light (SH light in this case) output from a nonlinear optical crystal, and determining necessary parameters (S' and ΔS in this case) from this value, and performing fuzzy inference on these parameters, the angle of rotation of the motor necessary for creating the required optical path change can be calculated.

The device given as an embodiment is a device that realizes wavelength conversion by SHG, and where the light to be converted that is made to enter the nonlinear optical crystal is one sort of fundamental wave light. However, other wavelength conversion devices exist that conduct wavelength conversion which have not just one sort, but two sorts of lights having different wavelengths as the incident light that is made to enter the nonlinear optical crystal, and use nonlinear optical effects such as sum frequency generation (SFG) or differential frequency generation (DFG) on this plurality of sorts of incident lights having different wavelengths. In order to make this plurality of incident lights enter the nonlinear optical crystal, and generate nonlinear optical effects, it is necessary, similarly to the case with SHG, to make it enter a nonlinear optical crystal at an angle of incidence that satisfies the phase matching conditions.

When using a wavelength conversion device that uses SFG or DFG as described above, it suffices to use optical path adjustment using fuzzy inference respectively for the two sorts of incident lights (lights that are to be converted) having different wavelengths that are made to enter the nonlinear optical crystal. In this case, in comparison with the embodiment for which there is only one sort of light that is to be converted, there are two adjusting places that are required for the optical path adjustment thereof. That is, whether a reflecting mirror is used as explained with reference to FIG. 1, or whether adjustment is done by mutually rotating a plurality of prisms, as explained with reference to diagram 2, since the number of sorts of lights to be converted has doubled to two sorts, the adjusting places thereof have also doubled.

However, since for the two sorts of incident lights (lights that are to be converted) having different wavelengths that are made to enter the nonlinear optical crystal, optical path adjustment similar to that done for the wavelength conversion device described in the embodiment of the present invention can be done similarly for each, so it is obvious that the optical path adjusting art based upon fuzzy inference of the present invention can basically be used as is.

Additionally, there are laser devices which have laser beams as pumping light sources (excitation light source). For example, there is a device that realizes the oscillation of a Ti: sapphire laser by irradiating a light beam output from an argon ion laser (pumping light) onto a Ti: sapphire crystal that is the lasing medium for a Ti: sapphire laser. Of course, the lasing medium is not restricted to Ti: sapphire, and many types of laser devices are known, such as YAG laser which use a YAG crystal as a lasing medium.

When producing, or operating a laser device such as those described above, alignment of the optical system of the laser device becomes necessary so as to maximize the intensity of the generated laser light relative to the incident intensity of the pumping light. The alignment carried out here is adjustment so as to satisfy the resonance conditions for optical resonator systems constituted by placing concave reflecting mirrors on both sides and sandwiching a lasing medium such as a Ti: sapphire crystal or a YAG crystal. During this alignment, the tilt of the concave reflecting mirrors placed on both sides and sandwiching the laser activation medium is adjusted. That is, by detecting the intensity of the laser light generated with a photodetector, the tilt of the two concave mirrors is adjusted so that this intensity is maximized.

The adjusting mechanism for the tilt of these two concave reflecting mirrors is in principle the same as the adjusting mechanism for the tilt of the reflecting surfaces of two reflecting mirrors that constitute the optical path adjusting portion of the wavelength conversion device of the present invention. Therefore, in laser devices such as those described above, it is obvious that an optical path adjusting mechanism based upon fuzzy inference can be realized by a similar method to the optical path adjustment in the wavelength conversion device of the present invention.

As explained above, it can be seen that applying a method based upon fuzzy inference to realize the automatic adjustment of an optical system of a device that includes an optical crystal that is a nonlinear optical crystal or a lasing medium as a constituent element is extremely effective.

The invention claimed is:

1. Wavelength conversion device comprising:
a laser light source for outputting a fundamental wave light,
a nonlinear optical crystal into which said fundamental wave light is made to enter to generate converted light having a wavelength different from the wavelength of said fundamental wave light,
an optical path adjusting portion for adjusting the direction of propagation of said fundamental wave light and the position of the light beam of said fundamental wave light in order to make said fundamental wave light enter said nonlinear optical crystal while satisfying phase matching conditions,
a photodetector for detecting the intensity of said converted light,
an adjustment value calculating means for calculating the adjustment values that respectively correspond to a plurality of adjustment means provided in said optical path adjusting portion, using fuzzy inference, from the value of the intensity of said converted light that is output from said photodetector,
and an optical path adjusting portion control device for controlling a plurality of adjustment means provided in said optical path adjusting portion, based upon said adjustment values calculated in said adjustment value calculating means.

2. Wavelength conversion device according to claim 1, characterized in that fuzzy inference is carried out using at least the time derivative value in the intensity of said converted light that is output from said photodetector, and the amount of deviation from the target value of the intensity of said converted light that is output from said photodetector.

3. Wavelength conversion device according to claim 1, characterized in that in said optical path adjusting portion, only prisms are used as the optical elements for adjusting the optical path.

4. Wavelength conversion device according to claim 1, characterized in that when optical path adjustment is being carried out, a return to zero operation is not carried out.

5. Wavelength conversion device according to claim 4, characterized in that the initial angle of rotation of one or more motors for driving optical elements for adjusting the optical path in said optical path adjusting portion are set randomly.

6. Wavelength conversion device according to claim 4, characterized in that the driving order of a plurality of motors for driving optical elements for adjusting the optical path in said optical path adjusting portion is set randomly.

* * * * *